United States Patent [19]

Ishida

[11] Patent Number: 4,501,436
[45] Date of Patent: Feb. 26, 1985

[54] SUPPORTING ASSEMBLY FOR A SUSPENSION

[75] Inventor: Takashi Ishida, Yokohama, Japan

[73] Assignee: Nissan Motor Company, Limited, Yokohama, Japan

[21] Appl. No.: 479,516

[22] Filed: Mar. 28, 1983

[30] Foreign Application Priority Data

Mar. 31, 1982 [JP] Japan .................................. 57-51188

[51] Int. Cl.³ .......................... B62D 21/02; B60G 7/02
[52] U.S. Cl. ..................................... 280/666; 180/291; 267/11 R; 267/57; 280/689
[58] Field of Search ...................... 280/666, 96.1, 660, 280/663, 667, 668, 670, 673, 688, 689; 267/11 R, 57 R, 57.1, 57.1 A, 143, 154, 155, 157, 165; 180/291

[56] References Cited

U.S. PATENT DOCUMENTS 3,037,762 6/1962 Axtmann ........................... 267/11 R
3,218,053 11/1965 Shreve ................................ 267/11 R

FOREIGN PATENT DOCUMENTS 90346 5/1983 European Pat. Off. ........... 280/666
544805 6/1956 Italy ....................................... 267/57

Primary Examiner—Joseph F. Peters, Jr.
Assistant Examiner—Mitchell J. Hill
Attorney, Agent, or Firm—Schwartz, Jeffery, Schwaab, Mack, Blumenthal & Koch

[57] ABSTRACT

A supporting assembly for a suspension to suspend the wheels of a vehicle is disclosed, in which a transverse member extends in a transverse direction of the vehicle body and a pair of tension rod brackets extend in a longitudinal direction of the body and affixed respectively at one end thereof to the opposite ends of the transverse member. The supporting assembly is elastically mounted under the body through insulators mounted in the pair of tension rod brackets. A pair of tension rods are affixed at one end thereof to the other ends of the tension rod brackets while at the other end to a pair of transverse links which are provided outward of said transverse member. The improvement is that a reinforcing member is provided with the end portions thereof connected to the pair of tension rod brackets and spaced from the transverse member.

7 Claims, 6 Drawing Figures

SUPPORTING ASSEMBLY FOR A SUSPENSION

BACKGROUND OF THE INVENTION

The present invention relates to a supporting assembly for a suspension to suspend the wheels of a vehicle, and more particularly to a compact and light suspension by which the vibration of the wheels can be absorbed while the vehicle is driving.

Generally, various shock forces are exerted to the wheels while a vehicle such as an automobile is running and cause undersirable vibration generally through the body of the vehicle. Therefore, means for reducing the vibration have to be provided in the suspension.

FIG. 1 illustrates an example of a conventional supporting assembly 11, wherein a pair of tension rod brackets 15 are attached respectively at one end thereof to the opposite ends of a transverse member 13. The supporting assembly 11 is placed under and elastically mounted to a body (not shown) through insulators 17. A pair of tension rods 23 are attached at one end thereof to the outer ends of wheel supporting members 19 of transverse links 21. The tension rods 23 are supported at the other end therof by the other ends of the tension rod brackets 15. A wheel is rotatably mounted through each of the wheel supporting members 19 to the body.

When shock forces are exerted to the wheel supporting members 19 through the wheels in the forward and reverse directions while the vehicle is driving, these forces are transmitted to the tension rod brackets 15 through the tension rods 23. If the tension rod brackets 15 are affixed to the body, their movement will be limited and the transverse member 13 will not be bent even when shock forces are applied to the supporting assembly.

However, in general, since the tension rod brackets 15 are elastically mounted to the body through the insulators 17, the above-mentioned shock forces cause a large bending moment in the transverse member 13. Hence, the transverse member 13 tends to deform and the tension rods will move in the front and rear directions of the body relative to the body. At this time, vibration occurs in the supporting assembly 11 since the transverse member 13 tends to restore its profile to the original state. This vibration is transmitted to the body when it exceeds a threshold force associated with the shock absorbing function of the insulators 17. There are, accordingly, problems in the prior art that the vibration degrades the noise and vibration absorbing performance, and that the power unit which is mounted on the supporting assembley 11 is adversely affected.

The following two approaches were proposed to eliminate these problems: namely, to increase the rigidity of the transverse member 13 by enlarging the cross section thereof; and to increase the thickness of the transverse member 13 or to reinforce the same. However, there are shortcomings in these methods; that is, in the former case, the capacity of the engine oil pan is limited and the height of the transverse member 13 from the ground becomes low with respect to the body layout; and in the latter case, the weight and the cost of the supporting assembly increase.

SUMMARY OF THE INVENTION

A primary object of the present invention is to provide a supporting assembly for a suspension in which a compact and light supporting assembly which is not easily deformed can be realized. Another object of the invention is to provide a supporting assemlby for a suspension in which the shock forces transmitted to the tension rods can be securely received by the reinforcing member.

Briefly described, these and other objects of the present invention are accomplished by the provision of an improved supporting assembly for a suspension, which comprises: a transverse member attached in a transverse direction to a vehicle body; a pair of tension rod brackets which are attached in the longitudinal direction of the body to the opposite ends of said transverse member; insulators which are mounted to the pair of tension rod brackets and through which said supporting assembly is elastically mounted under the body; a pair of tension rods each having one end thereof connected to each of the other ends of said tension rod brackets; a pair of transverse links extending outwardly from said transverse member, said tension rods being attached at the other end thereof to said transverse links, respectively; a stick-like reinforcing member the opposite ends of which are connected to said pair of tension rod brackets at positions spaced from said transverse member.

BRIEF DESCRIPTION OF THE DRAWINGS

These and other objects, features and advantages of the present invention will be more apparent from the following description of a preferred embodiment, taken in conjunction with the accompanying drawings, in which.

DESCRIPTION OF THE PREFERRED EMBODIMENT

Figure 1:
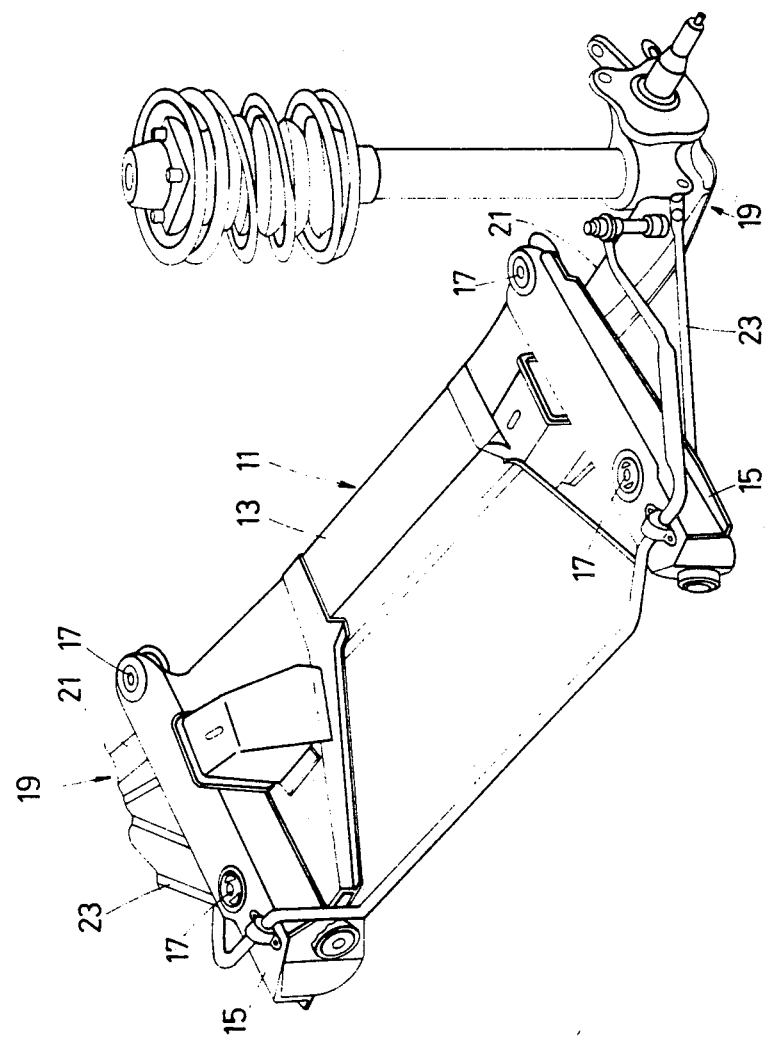
FIG. 1 is a perspective view showing a conventional supporting assembly for a suspension.
Figure 2:
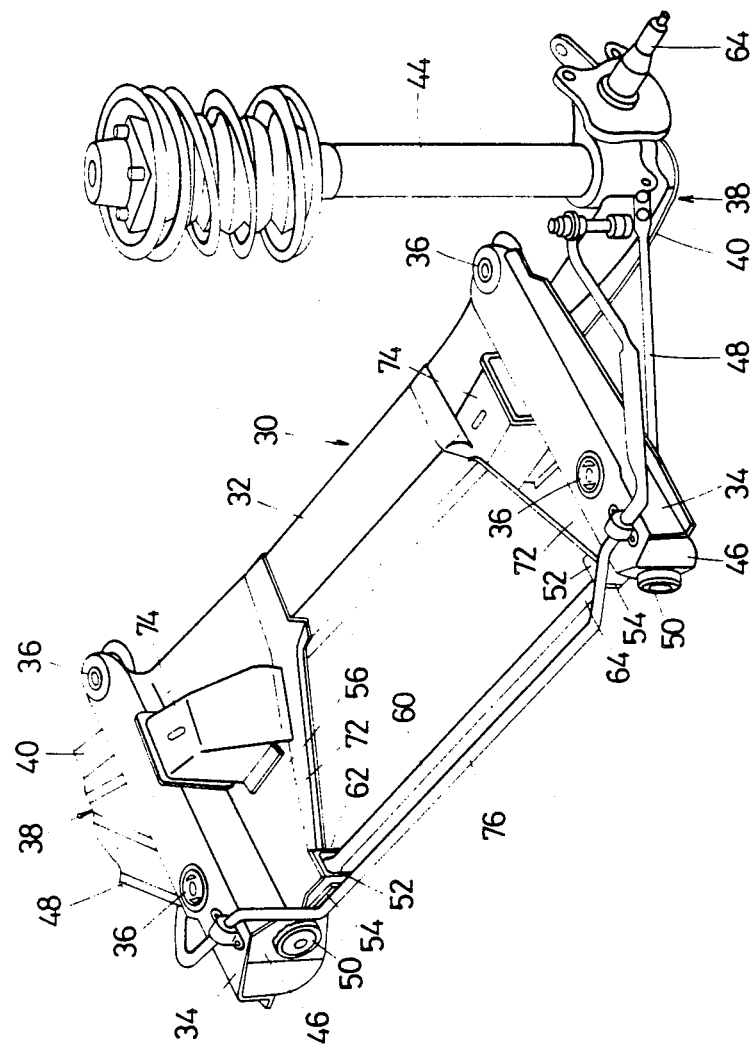
FIG. 2 is a perspective view of the supporting assembly for the suspension in which the present invention is employed.

Referring to FIG. 2, there is generally indicated by numeral 30 an embodiment of a supporting assembly for the suspension of an automobile comprising a transverse member 32 and a pair of tension rod brackets 34 which are attached to the opposite ends of a transverse member 32 in an automobile body. The support assembly in connected to the engine of the automobile through bed seats 74. In addition, a stabilizer 76 is mounted to the support assembly.

The transverse member 32 is disposed perpendicularly to the longitudinal direction of the body (not shown). The pair of tension rod brackets 34 are welded and fixed respectively at one end thereof to the opposite ends of the transverse member 32 so that they extend in the longitudinal direction of the body. The supporting assembly 30 is elastically mounted to the body through insulators 36 which are attached to the opposite ends of the tension rod brackets 34.

A wheel supporting member 38 is fixed to the outer edge of respective transverse links 40. The transverse links 40 are swingingly attached to the opposite ends of the transverse member 32 through insulators (not shown). The wheel supporting member 38 comprises a spindle 64 for rotatably supporting a wheel (not shown) and a member for supporting the bottom portion of a hub and a suspension strut 44 affixed thereto. The upper end of the suspension strut 44 is fixed to the body (not shown).

A pair of rod receiving brackets 46 are mounted to the other ends of the tension rod brackets 34 remote from the transverse member 32, respectively.

A pair of tension rods 48 are supported respectively at one end thereof by the rod receiving brackets 46 through insulators 50. The other end of each of the tension rods 48 is disposed outwardly from the tension rod bracket 34 in the transverse direction of the body and connected to the outer edge of the transverse link 40.

A reinforcing member 60 extends between both of the opposed tension rod brackets 34. This reinforcing member 60 is of a stick-like shape and has a circular cross section with the opposite end portions 62 and 64 thereof formed into a plate-like shape. A reinforcing bracket 52 is mounted to the inside of each of the tension rod brackets 34 at the other end thereof, that is to say, near the rod receiving bracket 46.

Figure 3:
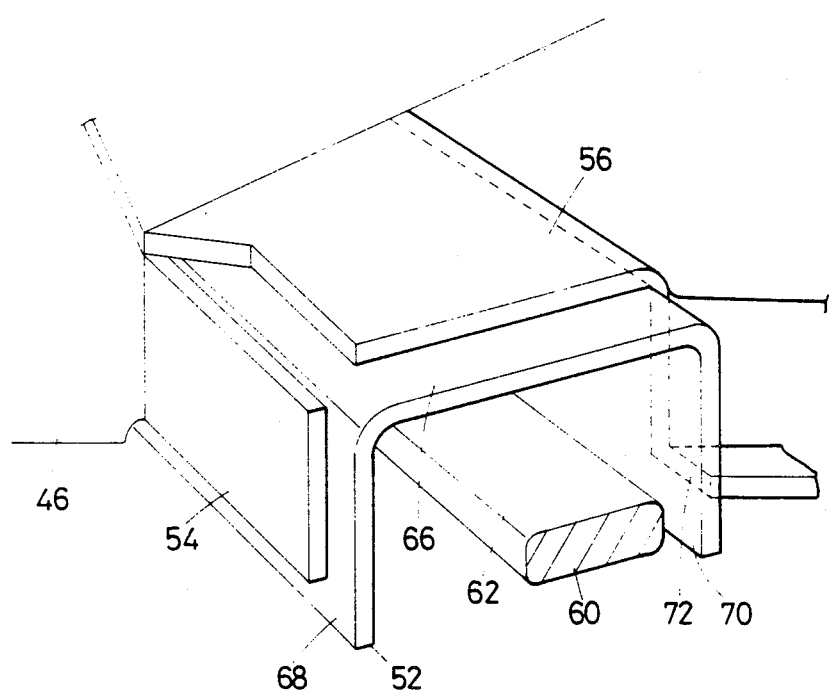
FIG. 3 is an enlarged perspective view showing the attachment of the reinforcing member of the present invention.
Figure 4:
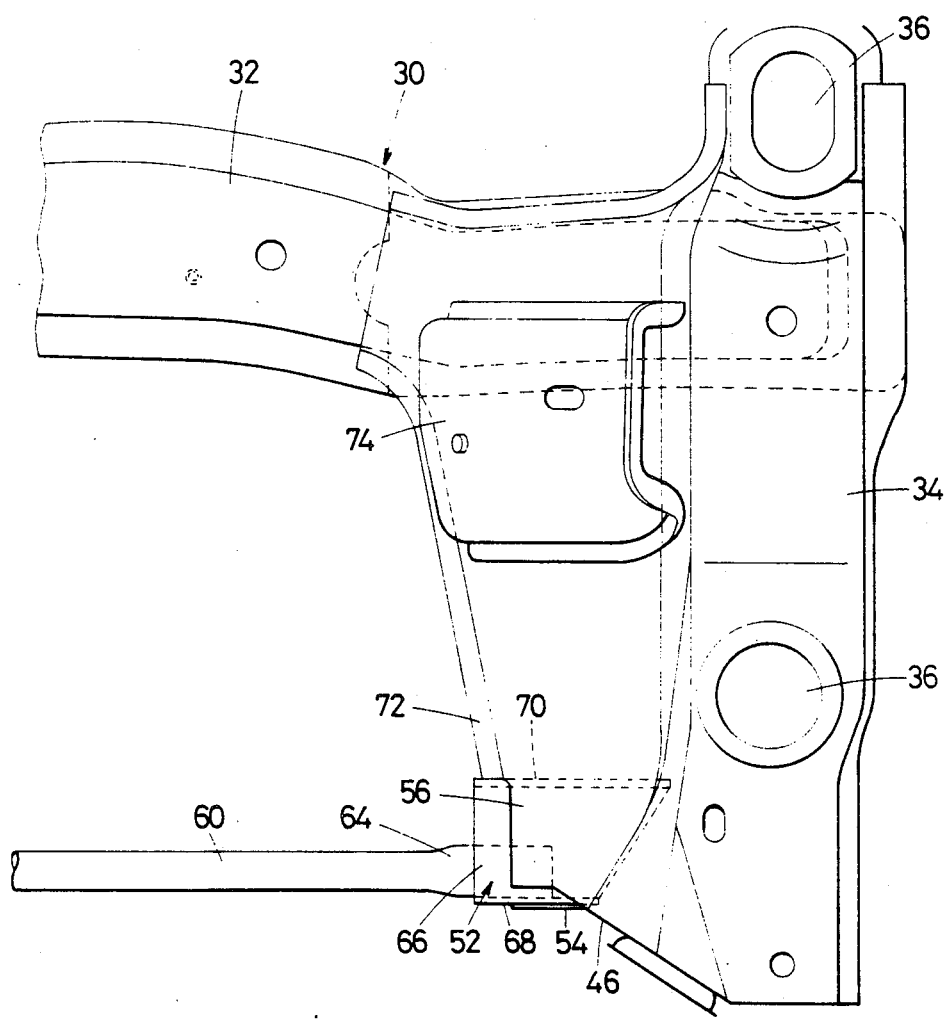
FIG. 4 is an enlarged top plan view of a principal portion, with a part taken away.
Figure 5:
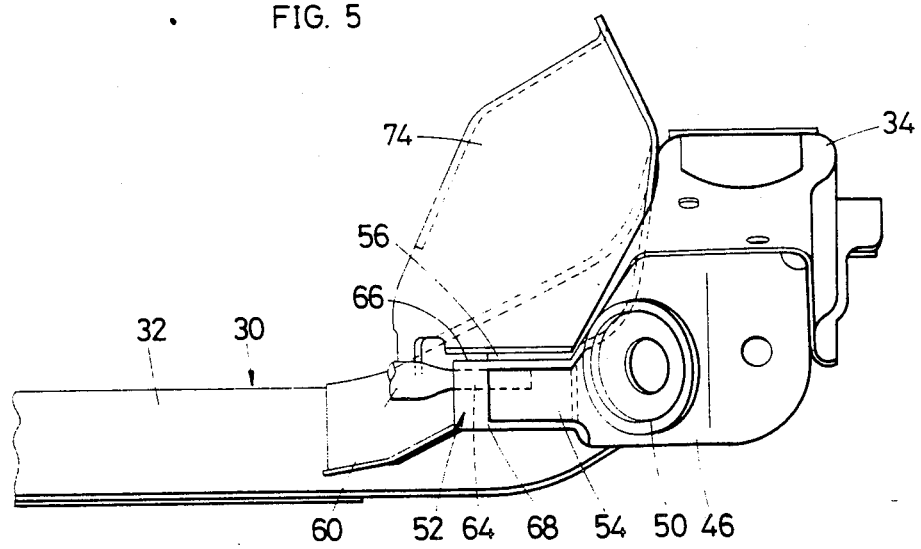
FIG. 5 is a partially cut-away, enlarged front elevational view of the portion shown in FIG. 4.
Figure 6:
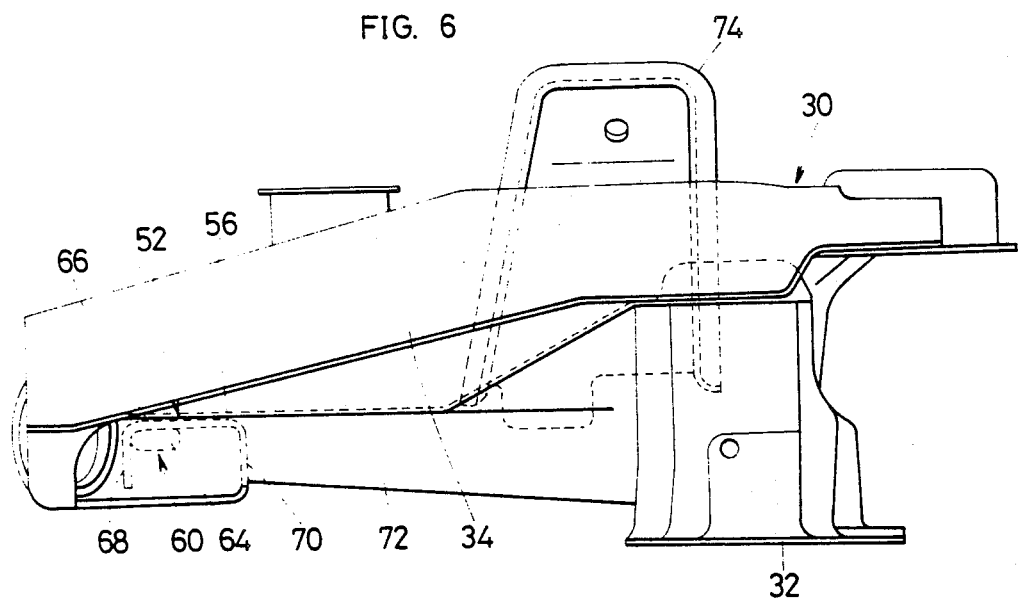
FIG. 6 is an enlarged side elevational view of the portion shown in FIG. 4.

The above-mentioned reinforcing member and the reinforcing brackets are described hereinafter in detail with reference to FIGS. 3 and 6. The reinforcing bracket 52 comprises a top plate 66, a front side plate 68 and rear side plate 70. The top plate 66 is bonded, e.g. by welding, to the lower surface of a shelf plate 56 overhanging inwardly from the tension rod bracket 34. The front side plate 68 is bonded to the inner surface of a receiving bracket 54. The bracket 54 is attached to and extends inwardly from the rod receiving bracket 46. The rear side plate 70 in bonded to the inner surface of a falling portion 72 of the shelf plate 56.

Hence, the reinforcing bracket 52 is surrounded and strongly supported by the shelf plate 56, the falling portion 72 and the receiving bracket 54. The afore-mentioned plate-like end portions 62 and 64 of the reinforcing member 60 are thus bonded to the top plates 66 and the front side plate 68 of the reinforcing brackets 52, respectively.

The function of the above embodiment is described hereinafter.

When braking suddenly during driving, shock force will be exerted in the front and rear directions to the transverse links 40 through the spindles 64 from the wheels (not shown). The shock forces are transmitted to the other ends of the tension rod brackets 34 through the tension rods 48, the insulators 36 and the rod receiving brackets 46. The shock forces are further transmitted from the tension rod brackets 34 securely to the reinforcing brackets 52, and receiving by the stick-like reinforcing member 60 at the opposite ends thereof substantially equally in the opposed directions.

Consequently, the shock forces transmitted to the other ends of the tension rod brackets 34 are offset through the member 60. Therefore, no large bending moment occurs in the transverse member 32. In this embodiment, the shock forces applied from the tension rods 48 to the rod receiving bracket 46 are securely transmitted to the reinforcing member 60 through the receiving brackets 54 integrally connected to the rod receiving brackets 46.

The reinforcing member 60 may be formed by a channel material or angle material, etc. in place of the stick-like member having a circular cross section used in the above mentioned embodiment. Although the reinforcing member 60 is attached to the tension rod brackets 34 through the reinforcing brackets 52, it may be attached directly to the brackets 34. It is not always necessary to provide the receiving brackets 54 for assuring the transmission of the shock forces to the reinforcing member 60. The end portions 62 of the reinforcing member 60 are connected to the bracket 34 at positions close to the rod receiving brackets 46 which support the tension rods 48 in the present embodiment. However, it is possible to dispose the end portions 62 at any suitable locations.

According to the invention, the shock forces transmitted from the wheels through the tension rods to the tension rod brackets can be received and supported by the reinforcing member. Accordingly, the tension rod brackets do not deform so largely, so that any large bending moment in the transverse member which would otherwise be caused by the tension rod brackets can be avoided. Therefore, it is possible to prevent the degradation in noise and vibration absorbing property caused by the deformation of the supporting assembly while maintaining the supporting assembly as well as the transverse member compact and light, thereby providing the supporting assembly at a low price and with an increased engine oil pan capacity and it is also possible to keep the supporting assembly sufficiently high from the ground.

In summary, the shock forces from the tension rods can be securely received by the reinforcing member which is provided between the tension rod brackets at the ends thereof remote from the transverse member. It is possible to make the reinforcing member light in weight by using a stick-like reinforcing member. The shock forces from the tension rods can be securely transmitted to the reinforcing member which is connected to the reinforcing brackets for reinforcing the tension rod brackets. In addition, the shock forces can be securely transmitted to the reinforcing member which is connected to the receiving brackets affixed to the reinforcing brackets.

Although a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. A suspension supporting assembly for a vehicle body, comprising:
   a transverse member extending in a transverse direction of said vehicle body;
   a pair of tension rod brackets extending in a longitudinal direction of said vehicle body and affixed at one end thereof to opposite ends of said transverse member;
   said supporting assembly being elastically mounted under said vehicle body only through insulators mounted in said pair of tension rod brackets so as to reduce vibrations which are transmitted from said assembly to said vehicle body;
   a pair of tension rods affixed at one end thereof to other ends of said tension rod brackets;

a pair of transverse links attached outward of said transverse member;

said tension rods being attached at the other end thereof to said transverse links; and a reinforcing member provided with end portions thereof connected to said pair of tension rod brackets and spaced from and disposed parallel to said transverse member.

2. The supporting assembly for a suspension as claimed in claim 1, wherein said reinforcing member is provided between said other ends of said tension rod brackets.

3. The supporting assembly for a suspension as claimed in claim 1, wherein said reinforcing member is of a stick-like shape.

4. The supporting assembly for a suspension as claimed in claim 3, wherein said reinforcing member is connected to reinforcing brackets for reinforcing said tension rod brackets.

5. The supporting assembly for a suspension as claimed in claim 4, wherein rod receiving brackets for transmitting the shock forces from said tension rods are affixed to said reinforcing brackets.

6. The supporting assembly for a suspension as claimed in claim 5, wherein said reinforcing member is connected to both said reinforcing bracket and said tension rod bracket.

7. The supporting assembly of claim 1, wherein said reinforcing member end portions are fixedly connected to said pair of tension rod brackets.

* * * * *